United States Patent
Saruta et al.

(10) Patent No.: US 9,052,400 B2
(45) Date of Patent: Jun. 9, 2015

(54) RADIATION DETECTION APPARATUS AND IMAGING SYSTEM

(71) Applicant: CANON KABUSHIKI KAISHA, Tokyo (JP)

(72) Inventors: Shoshiro Saruta, Kodama-gun (JP); Yoshihiro Ogawa, Hachioji (JP); Akiya Nakayama, Kawasaki (JP); Masayoshi Tokumoto, Kawasaki (JP); Yoshito Sasaki, Kumagaya (JP); Satoshi Okada, Tokyo (JP); Satoru Sawada, Fujioka (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 96 days.

(21) Appl. No.: 13/903,181

(22) Filed: May 28, 2013

(65) Prior Publication Data
US 2013/0322598 A1 Dec. 5, 2013

(30) Foreign Application Priority Data

Jun. 4, 2012 (JP) .............................. 2012-127535
Mar. 15, 2013 (JP) .............................. 2013-054140

(51) Int. Cl.
*H05G 1/64* (2006.01)
*G01T 1/20* (2006.01)

(52) U.S. Cl.
CPC ............. *G01T 1/2006* (2013.01); *G01T 1/2018* (2013.01)

(58) Field of Classification Search
CPC ........ H04N 5/32; H04N 5/335; G01T 1/2928; G01T 1/2018; G01T 1/20; G01T 1/24
USPC ....................................... 378/98.8; 250/370.11
See application file for complete search history.

(56) References Cited

U.S. PATENT DOCUMENTS

| 7,256,404 | B2 | 8/2007 | Inoue et al. |
| 7,514,686 | B2 | 4/2009 | Ogawa et al. ............. 250/361 R |
| 8,304,735 | B2 | 11/2012 | Inoue et al. |
| 2004/0174951 | A1 | 9/2004 | Hoffman ...................... 378/98.8 |
| 2010/0291726 | A1 | 11/2010 | Vieux et al. ..................... 438/59 |

(Continued)

FOREIGN PATENT DOCUMENTS

| CN | 1526361 | 9/2004 |
| CN | 101002110 | 7/2007 |
| CN | 101689556 | 3/2010 |
| CN | 101849197 | 9/2010 |
| JP | 2011-117966 | 6/2011 |

OTHER PUBLICATIONS

U.S. Appl. No. 13/945,061, filed Jul. 18, 2013.

(Continued)

*Primary Examiner* — Jurie Yun
(74) *Attorney, Agent, or Firm* — Fitzpatrick, Cella, Harper & Scinto

(57) ABSTRACT

A radiation detection apparatus comprising a sensor panel in which a plurality of sensors for detecting light are arranged, and a scintillator layer containing scintillator particles for converting an incident radiation into light, and an adhesive resin which has an adherence property and bonds the scintillator particles, wherein the scintillator layer is adhered to the sensor panel by the adhesive resin, a modulus of elasticity in tensile of the adhesive resin is higher than 0.7 GPa and lower than 3.5 GPa, and a volume ratio of the adhesive resin to the scintillator particles is not lower than 1% and not higher than 5%.

20 Claims, 12 Drawing Sheets

(56) References Cited

U.S. PATENT DOCUMENTS

2010/0296625 A1* 11/2010 Wainer et al. .................... 378/19
2011/0133092 A1    6/2011 Hansen et al. ................ 250/366
2014/0014846 A1*  1/2014 Kaneko et al. ................ 250/369

OTHER PUBLICATIONS

Office Action issued on 9 Feb. 2015, in counterpart P.R. China patent application 201310218193.3, with translation.

* cited by examiner

F I G. 3
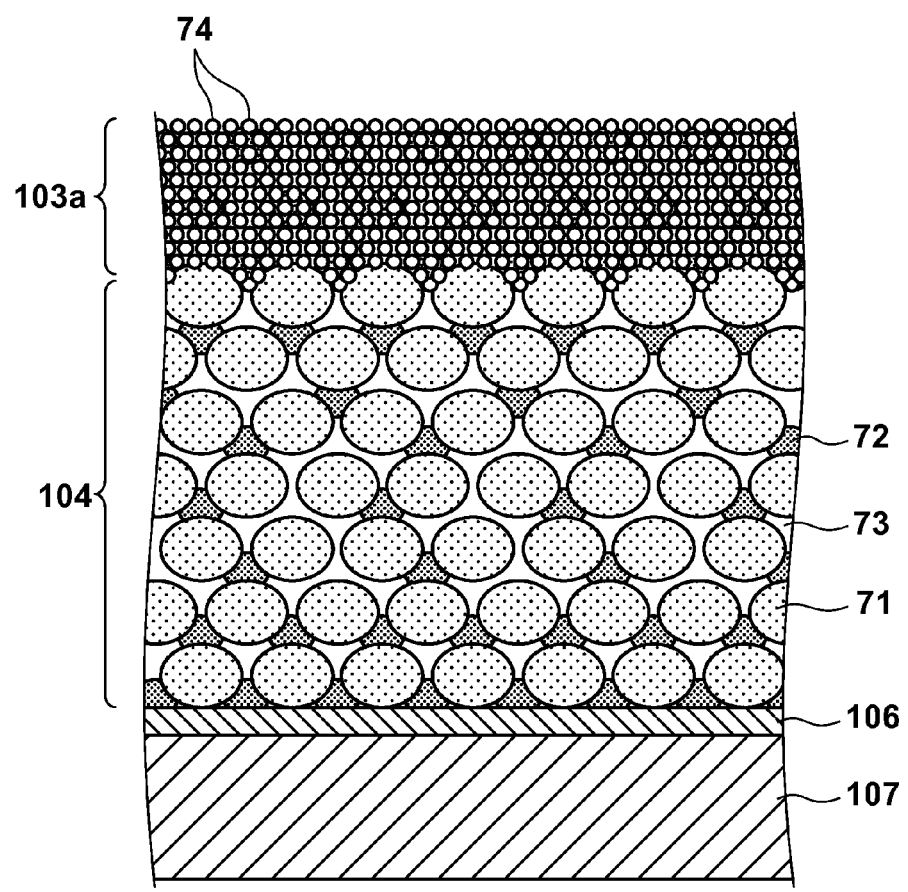

F I G. 6
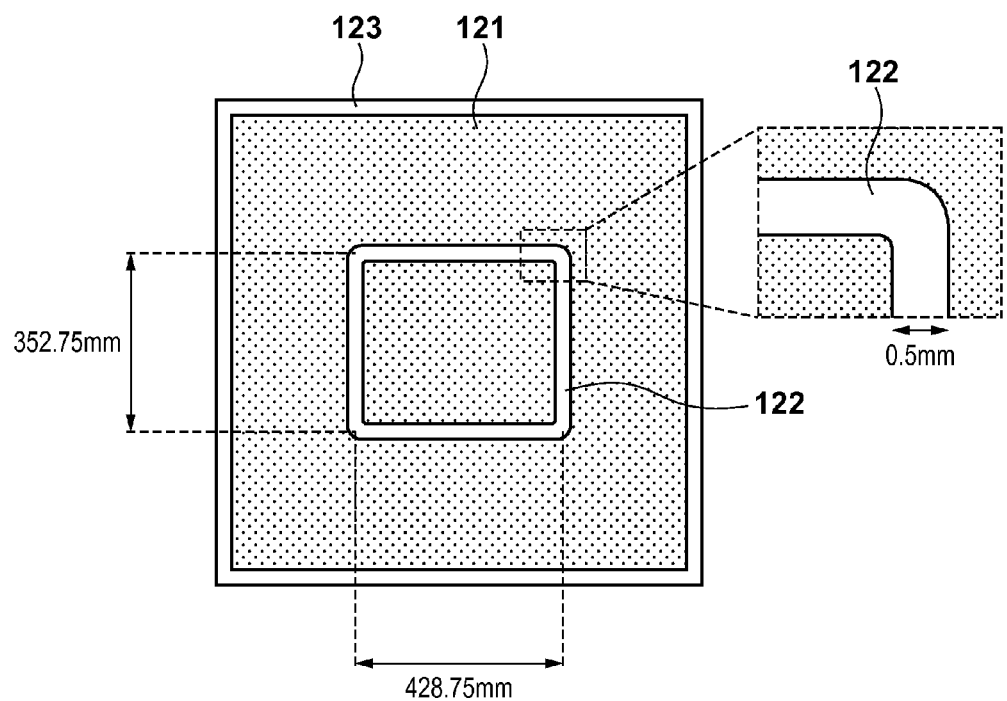

FIG. 7A

| | ITEMS | EXPERIMENTS # | REFERENCE EXAMPLE | EXPERIMENT 1 | | | | | |
|---|---|---|---|---|---|---|---|---|---|
| | | | | 1-1 | 1-2 | 1-3 | 1-4 | 1-5 | 1-6 |
| | ADHESIVE LAYER | | PRESENT | — | | | | | |
| CONDITIONS | MODULUS OF ELASTICITY IN TENSILE (GPa) | FIRST REGION R1 | 1.4 | 0.7 | 0.8 | 1.0 | 1.4 | 3.4 | 3.5 |
| | | SECOND REGION R2 | | | | | | | |
| | | THIRD REGION R3 | | | | | | | |
| | VOLUME RATIO (%) | FIRST REGION R1 | 5 | 2.5 | | | | | |
| | | SECOND REGION R2 | | | | | | | |
| | | THIRD REGION R3 | | | | | | | |
| | FLUID MATERIAL (REFRACTIVE INDEX) | | — | — | | | | | |
| | CONVEX FORMATION | | — | — | | | | | |
| | IN-PLANE THREE-DIMENSIONAL | | — | — | | | | | |
| | INORGANIC PARTICLE | | — | — | | | | | |
| | RESIN | | PVB | EC | | PVB | | PMMA | |
| | FLUORESCENT MATERIAL | MATERIAL | GOS | GOS | | | | | |
| | | MEDIAN SIZE | 6.2 | 6.2 | | | | | |
| | | MAXIMUM PARTICLE SIZE | 25 | 25 | | | | | |
| RESULTS | MTF | | 0.28 | 0.31 | | | | | |
| | SENSITIVITY | | 3700 | 3750 | | | | | |
| | OUTER SHAPE ACCURACY | | ±0.5% | ------- | | | | | |
| | THERMO CYCLE × FIRST TIME | | ○ | × | ○ | ○ | ○ | ○ | × |
| | THERMO CYCLE × SECOND TIME | | × | - | - | - | - | - | - |
| | THERMO CYCLE × THIRD TIME | | × | - | - | - | - | - | - |

FIG. 7B

| EXPERIMENT 2 | | | | | | EXPERIMENT 3 | | | | | | | EXPERIMENT 4 | | EXPERIMENT 5 |
|---|---|---|---|---|---|---|---|---|---|---|---|---|---|---|---|
| 2-1 | 2-2 | 2-3 | 2-4 | 2-5 | 2-6 | 3-1 | 3-2 | 3-3 | 3-4 | 3-5 | 3-6 | 3-7 | 4-1 | 4-2 | 5 |
| — | | | | | | — | | | | | | | — | | — |
| 2.0 | | | | | | 2.0 | | | | | | | 2.0 | | 2.0 |
| 0.9 | 1.0 | 2.5 | 3.5 | 5.0 | 5.1 | 2.5 | | | | | | | 2.5 | | 2.5 |
| — | | | | | | — | | | | | | | 1.4 | 1.6 | — |
| — | | | | | | — | | | | | | | — | | PRESENT (epoxy) |
| — | | | | | | — | | | | | | | — | | — |
| — | | | | | | — | | | | | | | — | | — |
| EC | | | | | | EC | | | | | | | EC | | EC |
| GOS | | | | | | GOS | | | | | | | GOS | | GOS |
| 6.2 | | | | | | 6.2 | 1.9 | 2 | 4 | 8 | 12 | 13 | 6.2 | | 6.2 |
| 25 | | | | | | 26 | 12 | 14 | 25 | 25 | 25 | 25 | 25 | | 25 |
| 0.31 | | | | | | 0.31 | | | | | | | 0.34 | 0.32 | 0.31 |
| 3750 | | | | | | 3750 | | | | | | | 3950 | 3850 | 3750 |
| 352.5+0.8, 428.5+1.0 (@2-2) | | | | | | ------ | | | | | | | ------ | | WITHIN ±0.5 mm |
| × | ○ | ○ | ○ | ○ | × | × | ○ | ○ | ○ | ○ | ○ | × | ○ | ○ | ○ |
| – | – | – | – | – | – | – | – | – | – | – | – | – | – | – | – |
| – | – | – | – | – | – | – | – | – | – | – | – | – | – | – | – |

FIG. 7C

| | EXPERIMENT 6 | EXPERIMENT 7 | | | EXPERIMENT 8 | | | EXPERIMENT 9 | | | EXPERIMENT 10 | | | | | EXPERIMENT 11 | |
|---|---|---|---|---|---|---|---|---|---|---|---|---|---|---|---|---|---|
| | 6 | 7-1 | 7-2 | 7-3 | 8-1 | 8-2 | 8-3 | 9-1 | 9-2 | 9-3 | 10-1 | 10-2 | 10-3 | 10-4 | 10-5 | 11-1 | 11-2 |
| | — | — | — | — | — | — | — | — | — | — | — | — | — | — | — | — | — |
| | 2.0 | 2.0 / 1.5 | 2.0 / 2.0 | 2.0 / 2.1 | 2.0 / 1.0 / 1.5 | 2.0 / 1.5 / 2.0 | 2.0 / 2.0 / 1.5 | 2.0 | 2.0 | 2.0 | 2.0 | 2.0 | 2.0 | 2.0 | 2.0 | 2.0 | 2.0 |
| | 2.5 | 2.5 | 2.5 | 2.5 | 2.5 | 2.5 | 2.5 | 2.5 / 3.0 | 2.5 / 2.5 | 2.5 / 2.0 | 2.5 / 1.5 / 2.0 | 2.5 / 1.5 / 1.5 | 2.5 / 1.5 / 1.0 | 2.5 / 2.0 / 2.5 | 2.5 / 2.0 / 2.0 | 2.5 | 2.5 |
| | — | — | — | — | — | — | — | — | — | — | — | — | — | — | — | — | — |
| | — | — | — | — | — | — | — | — | — | — | — | — | — | — | — | — | — |
| | PRESENT | — | — | — | — | — | — | — | — | — | — | — | — | — | — | — | — |
| | — | — | — | — | — | — | — | — | — | — | — | — | — | — | — | TiEC | TiPVB |
| | EC | EC/PVC | EC/PVC | EC/PVC | EC/PVC | EC/PVC | EC/PVC | EC | EC | EC | EC | EC | EC | EC | EC | EC | EC |
| | GOS | GOS | GOS | GOS | GOS | GOS | GOS | GOS | GOS | GOS | GOS | GOS | GOS | GOS | GOS | GOS | GOS |
| | 6.2 | 6.2 | 6.2 | 6.2 | 6.2 | 6.2 | 6.2 | 6.2 | 6.2 | 6.2 | 6.2 | 6.2 | 6.2 | 6.2 | 6.2 | 6.2 | 6.2 |
| | 25 | 25 | 25 | 25 | 25 | 25 | 25 | 25 | 25 | 25 | 25 | 25 | 25 | 25 | 25 | 25 | 25 |
| | 0.31 | 0.31 | 0.31 | 0.31 | 0.31 | 0.31 | 0.31 | 0.31 | 0.31 | 0.31 | 0.31 | 0.31 | 0.31 | 0.31 | 0.31 | 0.29 | 0.29 |
| | 3800 | 3750 | 3750 | 3750 | 3750 | 3750 | 3750 | 3750 | 3750 | 3750 | 3750 | 3750 | 3750 | 3750 | 3750 | 3950 | 3950 |
| | ------- | ------- | ------- | ------- | ------- | ------- | ------- | ------- | ------- | ------- | ------- | ------- | ------- | ------- | ------- | ------- | ------- |
| | ○ | ○ | ○ | ○ | ○ | ○ | ○ | ○ | ○ | ○ | ○ | ○ | ○ | ○ | ○ | ○ | ○ |
| | ○ | ○ | ○ | × | ○ | ○ | × | × | × | ○ | ○ | ○ | × | ○ | ○ | ○ | ○ |
| | ○ | — | — | — | ○ | × | × | — | — | — | ○ | × | × | × | × | ○ | × |

F I G. 9A-1
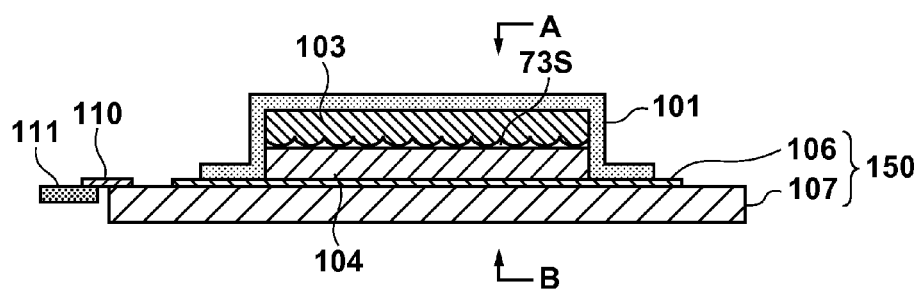
F I G. 9A-2
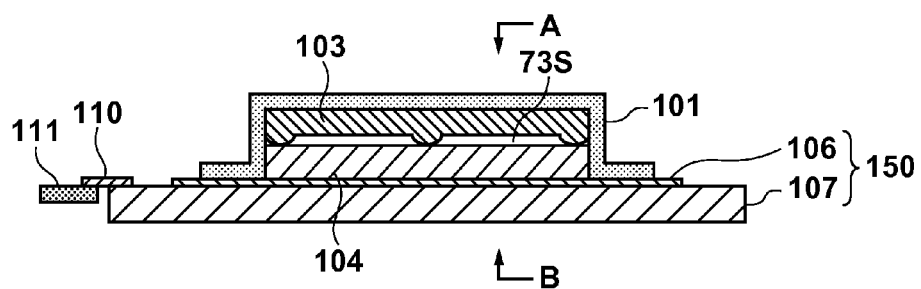
F I G. 9A-3
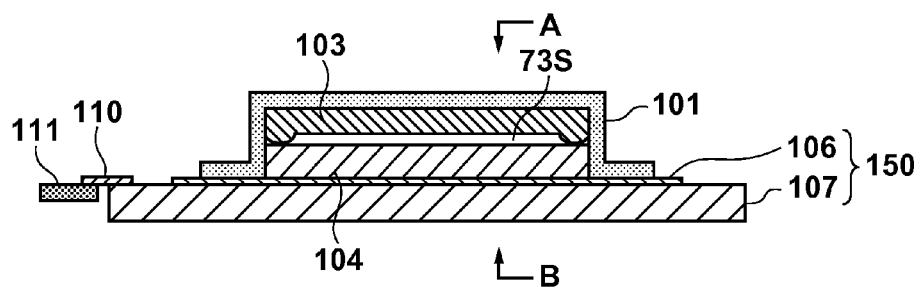

RADIATION DETECTION APPARATUS AND IMAGING SYSTEM

BACKGROUND OF THE INVENTION

1. Field of the Invention

The present invention relates to a radiation detection apparatus and imaging system.

2. Description of the Related Art

A radiation detection apparatus includes a sensor panel which detects light, and a scintillator layer which converts a radiation into light. Japanese Patent Laid-Open No. 2011-117966 discloses a structure in which a scintillator layer contains a pressure sensitive adhesive composition, and a sensor panel and the scintillator layer are directly adhered to each other. In Japanese Patent Laid-Open No. 2011-117966, an adhesive layer for adhering the sensor panel and scintillator layer is not interposed between them. This reduces the loss of light to be detected by the sensor panel and increases the sensitivity of the radiation detection apparatus.

In a structure including the adhesive layer between the sensor panel and the scintillator layer, the adhesive layer can reduce a stress applied to the radiation detection apparatus. This stress contains a stress which is generated by a temperature change during the heating or cooling process or the like in the manufacture. The structure described in Japanese Patent Laid-Open No. 2011-117966 does not consider the resistance to such stress.

SUMMARY OF THE INVENTION

One of the aspects of the present invention provides a technique advantageous for improving the reliability of a radiation detection apparatus.

One of the aspects of the present invention provides a radiation detection apparatus comprising a sensor panel in which a plurality of sensors for detecting light are arranged, and a scintillator layer containing scintillator particles for converting an incident radiation into light, and an adhesive resin which has an adherence property and bonds the scintillator particles, wherein the scintillator layer is adhered to the sensor panel by the adhesive resin, a modulus of elasticity in tensile of the adhesive resin is higher than 0.7 GPa and lower than 3.5 GPa, and a volume ratio of the adhesive resin to the scintillator particles is not lower than 1% and not higher than 5%.

Further features of the present invention will become apparent from the following description of exemplary embodiments with reference to the attached drawings.

BRIEF DESCRIPTION OF THE DRAWINGS

FIG. 3 is a view for explaining an example of an arrangement according to the second embodiment;

FIG. 6 is a view for explaining a screen printing plate used in screen printing;

FIGS. 7A to 7C are tables for explaining examples for respective embodiments;

FIGS. 9A-1 to 9A-3 are views for explaining examples of an arrangement according to the fourth embodiment; and FIGS. 9B-1 to 9B-3 are views for explaining examples of the arrangement according to the fourth embodiment.

DESCRIPTION OF THE EMBODIMENTS

<First Embodiment>

Figure 1A:
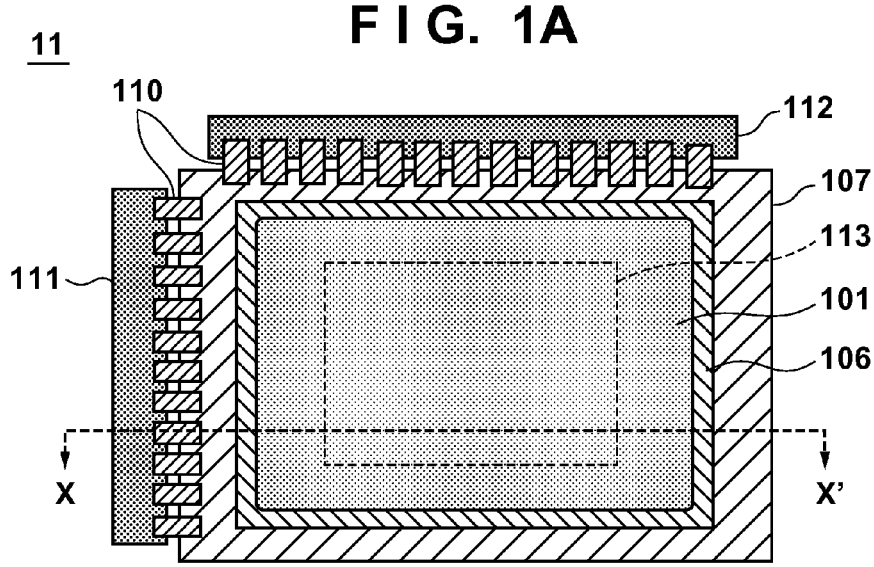
FIGS. 1A to 1C are views for explaining examples of an arrangement according to the first embodiment.

A radiation detection apparatus 11 according to the first embodiment will be described with reference to FIGS. 1A to 2B. FIG. 1A schematically shows the structure of the radiation detection apparatus 11 when viewed from above. The radiation detection apparatus 11 is connected via, for example, a flexible printed board 110 to a circuit board 111 for reading out a signal, and a circuit board 112 for driving the radiation detection apparatus 11. The radiation detection apparatus 11 detects a radiation on a pixel array 113 shown in FIG. 1A. A signal obtained by detecting the radiation is output to the circuit board 111 in accordance with a driving signal input from the circuit board 112.

Figure 1B:
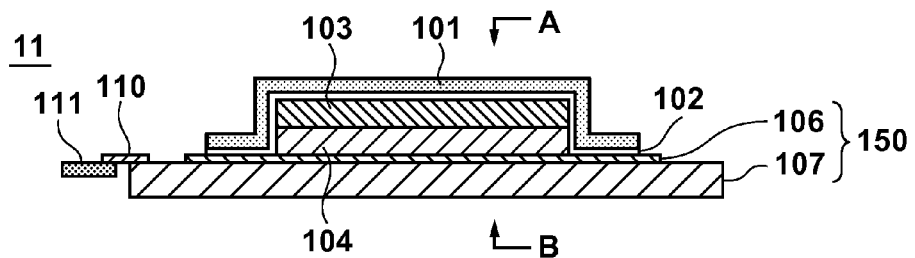

FIG. 1B schematically shows the sectional structure of the radiation detection apparatus 11 along a cut line X-X' in FIG. 1A. The radiation detection apparatus 11 includes a sensor panel 150 for detecting light, and a scintillator layer 104 for converting an incident radiation into light. The sensor panel 150 includes a plurality of sensors (not shown) which are formed on a sensor board 107 to detect light. Each sensor corresponds to a pixel including a photoelectric conversion element, and a switching element such as a thin film transistor (TFT). The pixel array 113 shown in FIG. 1A is formed from, for example, 2,800×3,408 pixels. The sensor panel 150 can include a sensor protection layer 106 for protecting the sensors. The scintillator layer 104 contains scintillator particles which convert an incident radiation into light, and an adhesive resin which has an adherence property and bonds scintillator particles. The scintillator layer 104 is adhered to the sensor panel 150 by an adhesive resin. For example, a base (reflection layer 103) having a function of diffusing and reflecting light can be arranged on a surface of the scintillator layer 104 opposite to a surface on which the sensor panel 150 and scintillator layer 104 are adhered. Also, an adhesive layer 102 and protection layer 101 can be arranged to cover the sensor panel 150 and scintillator layer 104.

The above-described arrangement can be formed by processes exemplified as follows. For example, a paste (material in which scintillator particles are dispersed in a vehicle) is prepared by dispersing scintillator particles in a vehicle (material in which a resin is dissolved in a solvent). Then, the paste is applied onto the sensor panel 150 (sensor board 107 or sensor protection layer 106) by a method such as screen printing or slit coating, thereby forming the scintillator layer 104. After that, the reflection layer 103 is transferred onto the scintillator layer 104. The protection layer 101 having the functions of an electromagnetic shield and specular reflection is adhered onto the sensor panel 150 via the adhesive layer 102 to cover the scintillator layer 104 and reflection layer 103. Note that the protection layer 101 need not always be arranged in contact with the entire sensor protection layer 106. For example, it suffices to arrange the protection layer 101 in contact with part of the sensor protection layer 106 while covering the whole reflection layer 103 and scintillator layer 104 and their peripheral portions.

A radiation traveling from the A side shown in FIG. 1B passes through the protection layer 101, adhesive layer 102, and reflection layer 103, and then enters the scintillator layer 104. The scintillator layer 104 generates light in accordance with the incident radiation (that is, converts the incident radiation into light), and the sensor panel 150 detects the light. Since a layer for adhering the sensor panel 150 and scintillator layer 104 is not interposed between them, this structure can reduce the loss of light caused by scattering or absorption of light, and suppress decreases in the sensitivity and MTF of the radiation detection apparatus 11. Similarly, even in a backside illumination radiation detection apparatus in which a radiation enters it from the B side, this structure can suppress decreases in sensitivity and MTF.

In terms of the humidity resistance, luminous efficiency, thermal process resistance, and persistence, a preferable example of the scintillator particle is a metal oxysulphide expressed by a general formula of $M_2O_2S:R$, in which "M" can include La, Y, Gd, and the like, and "R" can include Tb, Sm, Eu, Ce, Pr, Tm, and the like. In terms of the humidity resistance and protection of the sensor, the adhesive resin is preferably soluble in an organic solvent. Examples of the adhesive resin are a cellulosic resin such as thixotropic ethylcellulose or nitrocellulose, an acrylic resin such as polymethyl methacrylate, and a polyvinyl acetal resin such as polyvinyl butyral. The adhesive resin may be a combination of two or more resins mentioned above to satisfy the range of the modulus of elasticity in tensile described in the first embodiment.

Figure 2A:
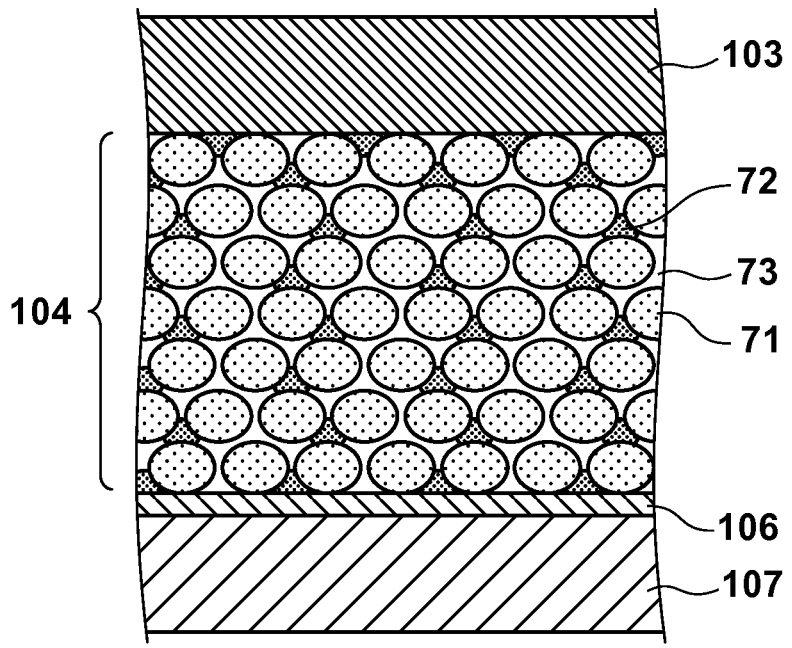
FIGS. 2A and 2B are views for explaining examples of the arrangement of a scintillator layer.

FIG. 2A schematically shows the arrangement of the scintillator layer 104. As described above, the scintillator layer 104 can have a structure containing scintillator particles 71 and an adhesive resin 72, and further containing a gap (for example, air 73).

The modulus of elasticity in tensile of the adhesive resin 72 is higher than 0.7 GPa and lower than 3.5 GPa. The volume ratio of the adhesive resin 72 to the scintillator particles 71 is equal to or higher than 1%, and equal to or lower than 5%. If the modulus of elasticity in tensile of the adhesive resin 72 is equal to or lower than 0.7 GPa, the adhesive force between the sensor panel 150 and the scintillator layer 104 or that between the reflection layer 103 and the scintillator layer 104 becomes insufficient, and they may peel off. If the modulus of elasticity in tensile is equal to or lower than 0.7 GPa, the adhesive force between the scintillator particles 71 contained in the scintillator layer 104 becomes insufficient, and the shape of the scintillator layer 104 itself may be deformed. This also applies to a case in which the volume ratio of the adhesive resin 72 to the scintillator particles 71 is lower than 1%. To the contrary, if the modulus of elasticity in tensile is equal to or higher than 3.5 GPa, a stress applied to the scintillator layer 104 is hardly absorbed, and the scintillator layer 104 and a portion adjacent to it may peel off. If the volume ratio of the adhesive resin 72 to the scintillator particles 71 is higher than 5%, the ratio of the air 73 capable of absorbing the stress relatively decreases, and the scintillator layer 104 and a portion adjacent to it may peel off.

From this, the embodiment improves the reliability of the radiation detection apparatus 11 by setting the modulus of elasticity in tensile of the adhesive resin 72 to be higher than 0.7 GPa and lower than 3.5 GPa, and setting the volume ratio of the adhesive resin 72 to the scintillator particles 71 to be equal to or higher than 1%, and equal to or lower than 5%. The effect is obvious even from measurement results (FIGS. 7A to 7C) in examples to be described later.

As the scintillator particle 71, a particle having a particle size of 25 µm or smaller is used. If a particle (including a projecting shape) having a particle size of larger than 25 µm exists on the surface of the scintillator layer 104, an air bubble is generated at the boundary between the scintillator layer 104 and a portion adjacent to it, and they may peel off. Also, as the scintillator particle 71, a particle having a median size (50% particle size) of 2 µm or larger and 12 µm or smaller is used. If the median size of the scintillator particle 71 is smaller than 2 µm, the adhesive force between individual particles decreases. If the median size of the scintillator particle 71 is larger than 12 µm, an air bubble is generated at the above-mentioned boundary, and the scintillator layer 104 and a portion adjacent to it may peel off. To prevent this, as the scintillator particle 71 of the scintillator layer 104, a particle having a particle size of 25 µm or smaller and a median size of 2 µm or larger and 12 µm or smaller is preferably used. The particle size is an expedient value corresponding to the diameter of a particle when the particle is assumed to be a perfect sphere. The particle size in this specification was measured using the Coulter counter method or the laser diffraction scattering method (microtrack method).

The scintillator layer 104 preferably further contains, of air and a fluid material, at least the fluid material. The refractive index of the fluid material is preferably equal to or higher than 1, and equal to or lower than the refractive index of the scintillator particle. An example of the fluid material is silicone oil. The fluid material can reduce the loss of light caused by scattering or absorption of light between the scintillator particles 71 and the air 73, and suppress decreases in the sensitivity and MTF of the radiation detection apparatus 11. This may be achieved by a method of filling the scintillator layer 104 with a resin or the like, and then drying and solidifying the resin. However, considering the flexibility of the scintillator layer 104, a fluid material is preferably used. To absorb the stress, the scintillator layer 104 may contain both air and the fluid material. The scintillator layer 104 further preferably contains a binding agent such as colloidal silica which applies a binding action between the scintillator particles 71.

Figure 1C:
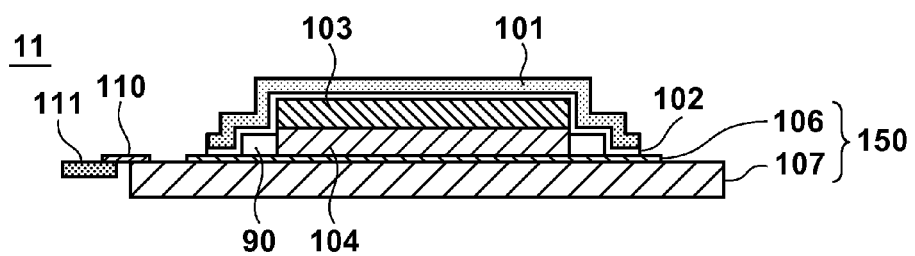

As exemplified in FIG. 1C, a projecting portion 90 may be arranged on the sensor panel 150 to surround a region where the sensor panel 150 and scintillator layer 104 contact each other. When the aforementioned fluid material is used, the scintillator layer 104 can be easily filled with the fluid material by using a method such as printing, spraying, or dipping because of the capillarity of the scintillator layer 104. However, for example, when the viscosity of the fluid material is low at room temperature, the fluid material may leak from the scintillator layer 104. Also, when no fluid material is used, the accuracy of the outer shape of the scintillator layer 104 may decrease until the scintillator layer 104 is fully dried after it is applied. This can be prevented by arranging the projecting portion 90. The height (projection length) of the projecting portion 90 suffices to be equal to or larger than half the thickness of the scintillator layer 104, and equal to or smaller than the thickness of the scintillator layer 104. This is because the above-described problems become serious at a portion where the scintillator layer 104 and sensor panel 150 contact each other. The projecting portion 90 is preferably made of an epoxy resin or the like. The projecting portion 90 can be formed by patterning along the periphery of the region where the sensor panel 150 and scintillator layer 104 should contact each other. The projecting portion 90 may be formed using a wiring line such as a bias wiring line or signal wiring line which can be arranged on the sensor panel 150, or using a convex portion formed from a thin film having high surface energy.

When a surface of the sensor panel 150 on which the sensor panel 150 and scintillator layer 104 contact each other has a three-dimensional shape, the area by which they contact each other increases, further improving the adherence property.

The three-dimensional shape can be formed by, for example, applying and drying colloidal silica, alumina, or the like. The three-dimensional shape is preferably formed by paying attention to the transmittance, the size of the three-dimensional shape, and the like not to optically cut off the optical path of light generated in the scintillator layer 104.

Figure 2B:
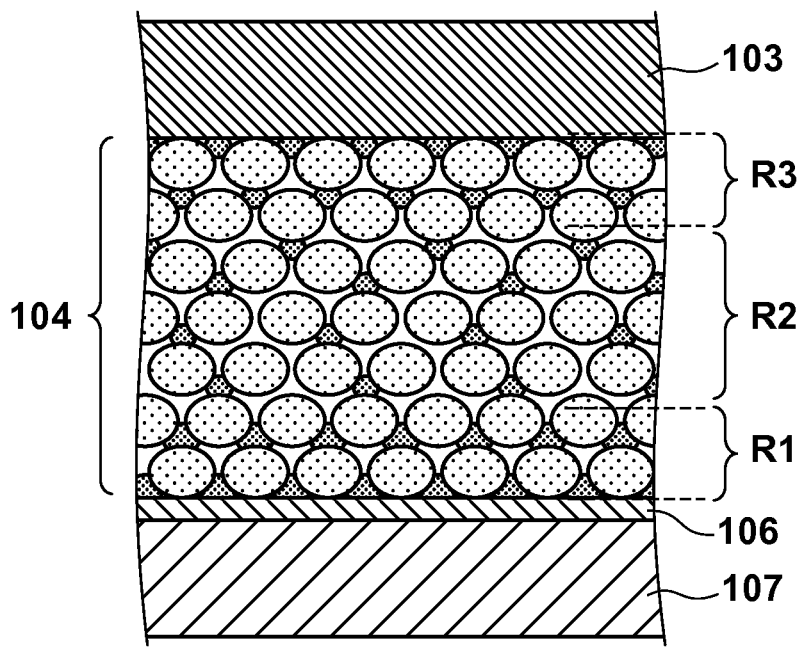

As exemplified in FIG. 2B, the scintillator layer 104 may have an arrangement which differs between regions. More specifically, the scintillator layer 104 has a distribution in which the modulus E of elasticity in tensile of the adhesive resin 72 is nonuniform in the direction of thickness. The scintillator layer 104 has a first region R1, second region R2, and third region R3 from the sensor panel 150 side toward the reflection layer 103 side (the first region R1, second region R2, and third region R3 may be given by, for example, dividing the scintillator layer 104 equally into three, or may not be equally divided regions). $E_{R1}$ is the modulus of elasticity in tensile of the adhesive resin 72 in the first region R1. $E_{R2}$ is the modulus of elasticity in tensile of the adhesive resin 72 in the second region R2. $E_{R3}$ is the modulus of elasticity in tensile of the adhesive resin 72 in the third region R3. The scintillator layer 104 is formed so that the modulus of elasticity in tensile satisfies a relation of $E_{R2} > E_{R3} > E_{R2}$ between the regions R1, R2, and R3.

Since the radiation detection apparatus 11 is greatly influenced by a stress of the scintillator layer 104 on the sensor panel 150 side, the scintillator layer 104 preferably has a resistance to the stress on the sensor panel 150 side. Although the adhesive layer 102 can reduce a stress of the scintillator layer 104 on the reflection layer 103 side, the scintillator layer 104 preferably has a resistance to the stress even on the reflection layer 103 side. Forming the scintillator layer 104 to satisfy the above-described relationship between the regions R1, R2, and R3 can suppress peeling between the scintillator layer 104 and the sensor panel 150 or between the scintillator layer 104 and the reflection layer 103.

For the same reason, the scintillator layer 104 can obtain the same effect by setting the volume ratio Vr/Vs of the adhesive resin 72 to the scintillator particles 71 to have a nonuniform distribution in the direction of thickness. $(Vr/Vs)_{R1}$ is the volume ratio of the adhesive resin 72 to the scintillator particles 71 in the first region R1. $(Vr/Vs)_{R2}$ is the volume ratio of the adhesive resin 72 to the scintillator particles 71 in the second region R2. $(Vr/Vs)_{R3}$ is the volume ratio of the adhesive resin 72 to the scintillator particles 71 in the third region R3. The scintillator layer 104 is formed so that the volume ratio of the adhesive resin 72 to the scintillator particles 71 satisfies a relation of $(Vr/Vs)_{R1} > (Vr/Vs)_{R3} > (Vr/Vs)_{R2}$ between the regions R1, R2, and R3. The effect is obvious even from measurement results (FIGS. 7A to 7C) in examples to be described later.

As described above, according to the first embodiment, while suppressing decreases in the sensitivity and MTF of the radiation detection apparatus 11, the reliability of the radiation detection apparatus 11 can be improved.

<Second Embodiment>

Figures 1, 9B:
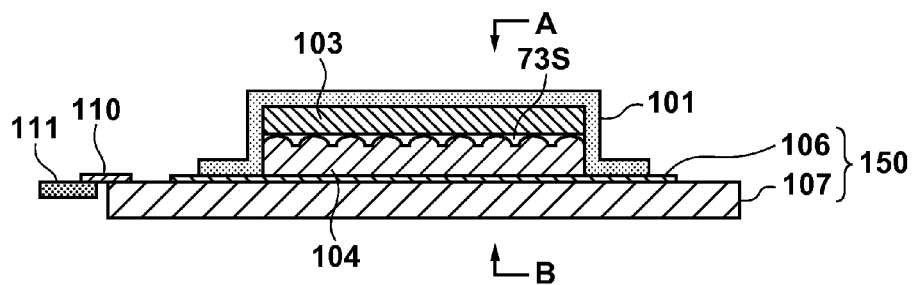
Figures 2, 9B:
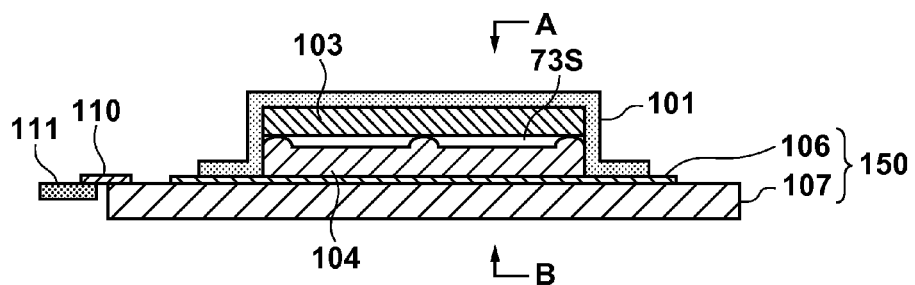
Figures 3, 9B:
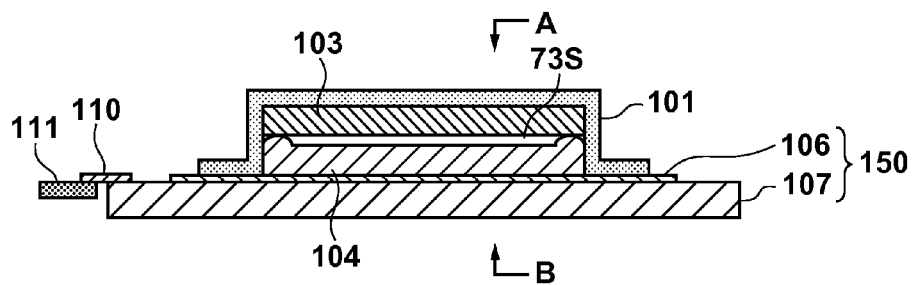

A radiation detection apparatus 12 according to the second embodiment will be described with reference to FIG. 3. The second embodiment is different from the first embodiment in that a reflection layer 103a containing inorganic powder particles 74 and an adhesive resin 72 is arranged instead of the reflection layer 103. The reflection layer 103a is formed by, for example, the same method using the adhesive resin 72 after forming a scintillator layer 104. The inorganic particle 74 is smaller in particle size than a scintillator particle 71 and can enter the gap between the scintillator particles 71. The reflection layer 103a and scintillator layer 104 have a good adherence property because the inorganic particles 74 and scintillator particles 71 contact each other by a large area. This obviates the need to arrange the adhesive layer 102 in order to fix the reflection layer 103a and scintillator layer 104.

An example of the inorganic particle 74 is a material which has a white matrix color and has a high diffusion reflectance. When an X-ray enters the scintillator layer 104 from the A side, for example, a rutile inorganic particle 74 having a small X-ray attenuation coefficient and low density, such as $TiO_2$, $Al_2O_3$, or $SiO_2$, is preferably used. To maintain good diffusion reflection of visible light, the particle size of the inorganic particle 74 is preferably set to about half the wavelength of visible light. That is, as the inorganic particle 74, a particle having a particle size of 190 nm or larger and 380 nm or smaller can be used. When the matrix color of the scintillator particle 71 is white, the scintillator particle 71 itself can have the diffusion reflection function. When an X-ray enters the scintillator layer 104 from the B side, for example, barium sulfate, lead oxide, bismuth oxide, or magnesium oxide may be used as the inorganic particle 74 regardless of the X-ray attenuation coefficient.

As described above, the adherence property between the reflection layer 103a and the scintillator layer 104 is improved, so the radiation detection apparatus 12 can suppress the loss of light while efficiently obtaining the same effects as those described in the first embodiment. The second embodiment can further suppress decreases in the sensitivity and MTF of the radiation detection apparatus 12.

<Third Embodiment>

As described above, a scintillator layer 104 contains scintillator particles 71 and an adhesive resin 72, and can further contain air 73 (gap). The air 73 is lower in refractive index than a surrounding member, and can reduce the loss of light caused by passage of light generated in the scintillator layer 104 through a reflection layer 103 or scattering of the light inside the reflection layer 103. In addition, the air 73 can reduce a compressive stress generated by a linear thermal expansion coefficient difference arising from an environmental change such as heating, cooling, or moistening in the manufacture of the radiation detection apparatus. This can reduce particularly the influence of a compressive stress generated by a linear thermal expansion coefficient difference between the scintillator layer 104 and the reflection layer 103.

Figure 8A:
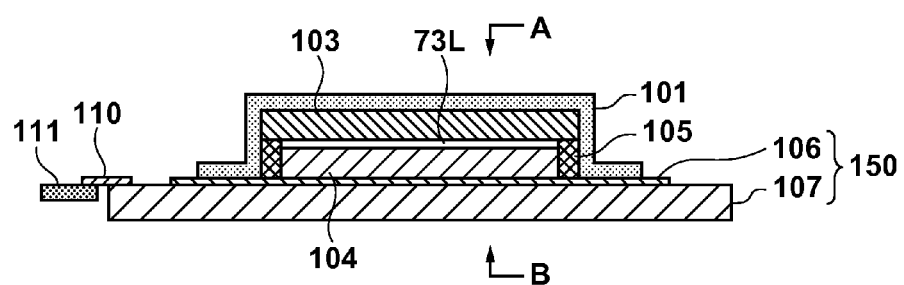
FIGS. 8A and 8B are views for explaining examples of an arrangement according to the third embodiment.
Figure 8B:
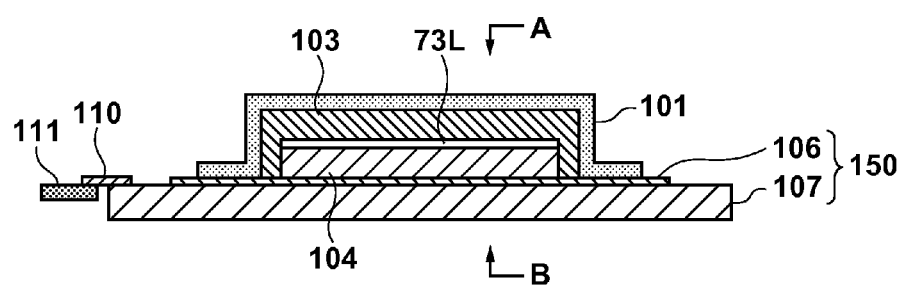

A radiation detection apparatus 13 according to the third embodiment will be described with reference to FIGS. 8A and 8B. Similar to FIG. 1B, FIG. 8A schematically shows the sectional structure of the radiation detection apparatus 13. The third embodiment is different from the first embodiment in that an air layer 73L is interposed between the scintillator layer 104 and the reflection layer 103.

A reflection layer support member 105 which is arranged along the periphery of the scintillator layer 104 can be arranged on the scintillator layer 104 (surface opposite to a sensor board 107). The reflection layer 103 can be arranged on the reflection layer support member 105. The air layer 73L is interposed between the reflection layer 103 and the scintillator layer 104, and the scintillator layer 104 and reflection layer 103 do not contact each other. This is achieved by arranging the reflection layer 103 to form the air layer 73L between the reflection layer 103 and the scintillator layer 104. The air layer 73L also functions as the reflection layer support member 105, as exemplified in FIG. 8B. Note that an adhesive layer 102 is not illustrated in the third embodiment.

Part of light generated in the scintillator layer 104 can be scattered by the surface of each scintillator particle 71, and enter the air layer 73L lower in refractive index than a surrounding member. This arrangement can reduce entrance of light from the low-refractive-index air layer 73L to the high-refractive-index reflection layer 103, and reduce the loss of light caused by transmission of the light through the reflection layer 103 or scattering of the light inside the reflection layer 103. As a result, light traveling from the air layer 73L can be effectively reflected by the surface of the reflection layer 103 toward the scintillator layer 104 and reach the sensor board 107.

If the thickness of the air layer 73L is set to be, for example, equal to or larger than 50 μm, light scattering occurs for a component having a relatively large incident angle out of light traveling from the scintillator layer 104 to the reflection layer 103, thereby decreasing the MTF. When the scintillator layer 104 uses scintillator particles, steps each corresponding to the maximum particle size of the scintillator particle can be generated on the upper surface of the scintillator layer 104. Thus, the air layer 73L is preferably arranged at a thickness considering them. The air layer 73L is therefore arranged to have a thickness falling within the range of 25 μm to 50 μm.

The reflection layer 103 needs to be sufficiently rigid to maintain the air layer 73L between the reflection layer 103 and the scintillator layer 104. For this reason, the reflection layer 103 can use a sufficiently rigid member, or undergo a dimple process, honeycomb process, or the like to have a sufficient rigidity. Note that the reflection layer 103 suffices to have a rigidity enough to resist deformation by its weight so as to maintain the air layer 73L between the reflection layer 103 and the scintillator layer 104. For example, to maintain a 25 μm-thick air layer 73L, the rigidity of a 0.4 m×0.4 m reflection layer 103 is set to be equal to or higher than 14 MPa. For example, a radiation detection apparatus for medical diagnosis or the like needs to consider the load of the weight of a subject to be examined. When the radiation detection apparatus is designed to resist a load of, for example, 200 kgf, the rigidity of the reflection layer 103 is set to be equal to or higher than 3 GPa. The reflection layer 103 can use a resin molding plate made of a light element (for example, an ABS resin, polycarbonate (PC) resin, or polypropylene (PP) resin). A thinner reflection layer 103 may be formed using a carbon fiber resin (for example, CFRP, PAN carbon fiber, anisotropic carbon fiber, or isotropic carbon fiber).

The first embodiment has exemplified the arrangement in which the air 73 exists between the scintillator layer 104 and the reflection layer 103. However, as exemplified in the third embodiment, the air layer 73L may be positively interposed between the scintillator layer 104 and the reflection layer 103. The air layer 73L can reduce the loss of light caused by passage of light generated in the scintillator layer 104 through the reflection layer 103 or scattering of the light inside the reflection layer 103. Also, the air layer 73L can reduce a compressive stress generated by a linear thermal expansion coefficient difference between the scintillator layer 104 and the reflection layer 103. The third embodiment can increase the sensitivity and MTF of the radiation detection apparatus and improve the reliability of the radiation detection apparatus. This also applies to a back-side illumination radiation detection apparatus in which a radiation enters it from the B side. Note that the air layer 73L in the embodiment is also applicable to an arrangement in which a columnar crystal (for example, CsI:Tl) alkali halide scintillator layer is formed on a sensor panel 150 by vapor deposition.

The radiation detection apparatus 13 can be formed by processes exemplified as follows. For example, a paste is prepared by dispersing, in a vehicle, a fluorescent powder such as $Gd_2O_2S$:Tb, colloidal silica for applying a binding action, and the like. Colloidal silica needs to satisfactorily ensure compatibility with an organic solvent, and an example is organosilicasol available from Nissan Chemical. Colloidal silica is preferably one which has an organically modified surface and has high compatibility in order to prevent suspension and foaming of the paste in stirring or use. Examples are organosilicasol MEK-AC-2101 and MIBK-SD available from Nissan Chemical. If the volume ratio of colloidal silica to the fluorescent material is lower than 0.5%, no sufficient binding force is obtained. In contrast, if the volume ratio of colloidal silica to the fluorescent material is equal to or higher than 2.0%, the luminance can decrease. From this, the paste is preferably generated to have a volume ratio falling within the range of 0.5% to 2.0%.

The paste is applied onto the sensor panel 150 (the sensor board 107 or a sensor protection layer 106) by a method such as screen printing or slit coating to obtain a desired film thickness, and then is dried, thereby forming the scintillator layer 104. The reflection layer support member 105 can be formed along the periphery of the scintillator layer 104 or the periphery of a pixel array 113. The reflection layer 103 can be arranged on the reflection layer support member 105 so that the air layer 73L is positively formed between the scintillator layer 104 and the reflection layer 103. Further, a protection layer 101 having the moisture-proof function is arranged on the sensor panel 150 via, for example, the adhesive layer 102 to cover the scintillator layer 104 and reflection layer 103. The protection layer 101 can also function as an electromagnetic shield. When a deliquescent CsI:Tl columnar crystal scintillator layer is used, a satisfactory humidity resistance is required. For example, wet deposition using a polyvinylidene chloride solution, deposition by vacuum evaporation of a paraxylylene polymer, or coverage of a functional moisture-proof film or the like to shield the scintillator layer 104 from an external environment may be performed.

<Fourth Embodiment>

The third embodiment has exemplified the arrangement in which the air layer 73L is interposed between the scintillator layer 104 and the reflection layer 103. However, as long as the air layer 73L exists between the scintillator layer 104 and the reflection layer 103, the sensitivity, MTF, and reliability of the radiation detection apparatus can be increased, and the region where the scintillator layer 104 and reflection layer 103 partially contact each other may exist.

A radiation detection apparatus 14 according to the fourth embodiment will be described with reference to FIGS. 9A-1 to 9B-3. The fourth embodiment is different from the third embodiment in that one of a scintillator layer 104 and reflection layer 103 has a convex shape on a surface on which they face each other, and they partially contact each other. FIGS. 9A-1 to 9A-3 schematically show examples of the sectional structure of the radiation detection apparatus 14, similar to FIGS. 8A and 8B. The reflection layer 103 has a convex shape on its lower surface and partially contacts the scintillator layer 104. Similarly, FIGS. 9B-1 to 9B-3 schematically show examples of the sectional structure of the radiation detection apparatus 14. The scintillator layer 104 has a convex shape on its upper surface and partially contacts the reflection layer 103.

As exemplified in FIGS. 9A-1 and 9B-1, the convex shape of the reflection layer 103 or scintillator layer 104 can be cyclically arranged at a predetermined pitch. The cycle of the convex shape complies with the array of the above-mentioned sensors. For example, the cycle of the convex shape suffices to be N times of the pitch of the sensors (N is an integer). Accordingly, an air gap 73S corresponding to each sensor is formed between the scintillator layer 104 and the reflection layer 103. While suppressing generation of an artifact, the sensitivity, MTF, and reliability of the radiation detection apparatus can be increased. As described in the third embodiment, the air gap 73S is preferably set to have a thickness falling within the range of 25 μm to 50 μm.

Note that the convex shape on the lower surface of the reflection layer 103 can be formed by a method of, for example, thermally pressing the surface of a reflective film mainly formed from a PET film. The convex shape on the upper surface of the scintillator layer 104 can be formed by preparing a screen printing plate having openings at the sensor pitch and depositing a film using the mesh pattern.

The arrangement in which the convex shape of the reflection layer 103 or scintillator layer 104 is cyclically arranged at a predetermined pitch has been exemplified. However, the present invention is not limited to this arrangement. For example, the convex shape may be arranged in part of the center region and part of the peripheral region, as exemplified in FIGS. 9A-2 and 9B-2. Alternatively, the convex shape may be arranged in part of the peripheral region out of the center region and peripheral region, as exemplified in FIGS. 9A-3 and 9B-3.

As described above, the fourth embodiment obtains the same effects as those of the third embodiment, and is also advantageous for the design because the constraint on the rigidity of the reflection layer 103 is reduced, compared to the third embodiment. The fourth embodiment can omit the process of forming a reflection layer support member 105, and reduce the manufacturing cost. Note that the air gap 73S in the fourth embodiment is also applicable to an arrangement in which a columnar crystal alkali halide scintillator layer is formed on a sensor panel 150 by vapor deposition, similar to the third embodiment.

<Imaging System>

Figure 4:
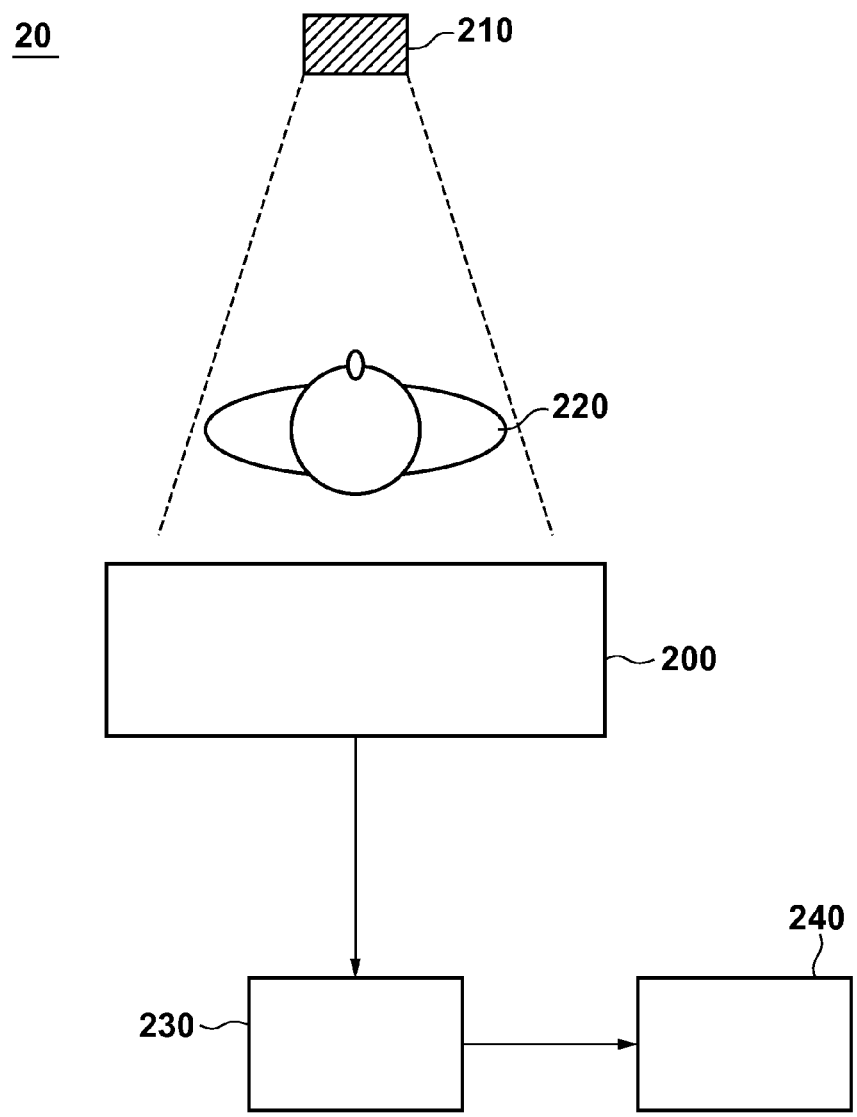
FIG. 4 is a view for explaining an example of an imaging system to which each embodiment is applied.

FIG. 4 schematically shows an imaging system 20 to which the radiation detection apparatuses 11 to 14 according to the above-described four embodiments are applied. The imaging system 20 includes a housing 200 including, for example, the radiation detection apparatus 11, a signal processor 230 including an image processor and the like, a display unit 240 including a display and the like, and a radiation source 210 for generating a radiation. A radiation (a typical example is an X-ray) generated by the radiation source 210 passes through a subject 220 to be examined, and the radiation detection apparatus 11 of the housing 200 detects the radiation containing information of the interior of the body of the subject 220. For example, the signal processor 230 performs predetermined signal processing by using the obtained radiation image, generating image data. The display unit 240 displays the image data.

The four embodiments and an example of applying them to the imaging system have been described. However, the present invention is not limited to them, and the purpose, state, application, function, and other specifications can be appropriately changed. The present invention can also be practiced by another embodiment.

REFERENCE EXAMPLE

Prior to a description of examples complying with the respective embodiments, a radiation detection apparatus D (not shown) including an adhesive layer between a sensor panel and a scintillator layer will be described as a reference example. First, a semiconductor thin film using amorphous silicon was formed on a 550 mm×445 mm×0.7 t non-alkali glass substrate. Then, a sensor array in which a plurality of sensors for detecting light were arranged, and a plurality of wiring lines for driving these sensors were formed on the semiconductor thin film. The sensor includes a photoelectric conversion element and thin film transistor (TFT). In this case, a pixel array 113 is formed from 2,800×3,408 pixels. After that, an $SiN_x$ layer and polyimide resin layer were formed as a sensor protection layer 106, obtaining a sensor panel. Next, a base (352.5 mm×428.5 mm Lumirror E20 #188 available from TORAY) for forming a scintillator layer was prepared and set in a screen printer. The base has the function of diffusion reflection and the like, and corresponds to the reflection layer 103 in FIGS. 1A to 1C. As the scintillator material, $Gd_2O_2S$:Tb (NP-3010) (2 kg) available from Nichia was dispersed and stirred in terpineol (1 kg) available from Nippon Koryo. As a dispersant, BYC-2000 (very small quantity) available from BYC-Chemie was added and stirred. While the resultant material was heated (temperature of 150° C.), a polyvinyl butyral resin was added, dissolved, and then cooled, and butyl carbitol acetate was added. As a result, a paste adjusted to have a rotational viscosity of 300 Pa·s at a temperature of 25° C. and a rotational speed of 0.3 rpm was obtained. When a grind gauge was used after dispersing the prepared paste using a triple roll mill, the degree of dispersion was 25 μm.

By using the scintillator paste, screen printing was performed for the base for forming a scintillator layer. More specifically, screen printing was performed at a clearance of 2.2 mm using a screen printing plate (screen plate frame of 1,100 mm×1,200 mm, wire diameter of 80 μm, 3D 80 meshes) available from Sonocom. The opening was 352 mm×428 mm. After performing screen printing, leveling (15 min), drying (120° C., 45 min) in an IR heating furnace, and cooling to room temperature were performed. By the same procedures, screen printing was repetitively executed a total of three times. To reduce mesh marks, the mesh bias in screen printing was changed for each printing. The first printing used a 22.5° screen printing plate, the second printing used a 30° screen printing plate, and the third printing used a 45° screen printing plate. All the screen printing processes were performed at a squeegee angle of 75° and a squeegee rate of 20 mm/sec. In this manner, a fluorescent plate including a scintillator layer on the base was obtained.

Then, the fluorescent plate was set in a transfer apparatus, and a pressure sensitive adhesive sheet (DAITAC #8603 TNW-10) available from DIC was transferred to the fluorescent plate, thereby obtaining a plate on which the scintillator layer including a 10 μm-thick adhesive layer was mounted. The sensor panel was set in the transfer apparatus, and the scintillator layer-mounted plate was pasted at the center of the sensor panel to cover the pixel array 113. After a protection film was transferred to a sensor board to form a protection layer, pressure defoaming was performed to remove air bubbles from the side wall surface. As the protection film, a film prepared by depositing Al by 40 μm on a 50 μm-thick polyethylene terephthalate (PET) base film and further transferring a 10 μm-thick acrylic pressure sensitive adhesive was used. As a result, the protection layer has the functions of an electromagnetic shield and moisture retention for the sensors. In this fashion, the radiation detection apparatus D was obtained.

The MTF was evaluated as follows. Frist, the radiation detection apparatus was set in an evaluation apparatus, and a 20 mm-thick Al filter for removing a soft X-ray was set between the radiation detection apparatus and an X-ray source. The height between the board and the X-ray source was adjusted to 130 cm, and the radiation detection apparatus was connected to an electrical driving system. In this state, a rectangular MTF chart was mounted on the radiation detection apparatus at an angle of 2° to 3°. The radiation detection apparatus was exposed to a 50-ms X-ray pulse six times at a tube voltage of 80 keV and a tube current of 250 mA. The MTF chart was removed, and then the radiation detection apparatus was similarly exposed six times. The MTF was evaluated by analyzing images in, of the six exposures, three exposures in which the radiation dose was stable. The MTF of the radiation detection apparatus D was 0.280 at 2 lp/mm. As the sensitivity evaluation method, the radiation detection apparatus was similarly exposed under the same conditions. The sensitivity of the radiation detection apparatus D was 3,700 LSB.

Figure 5:
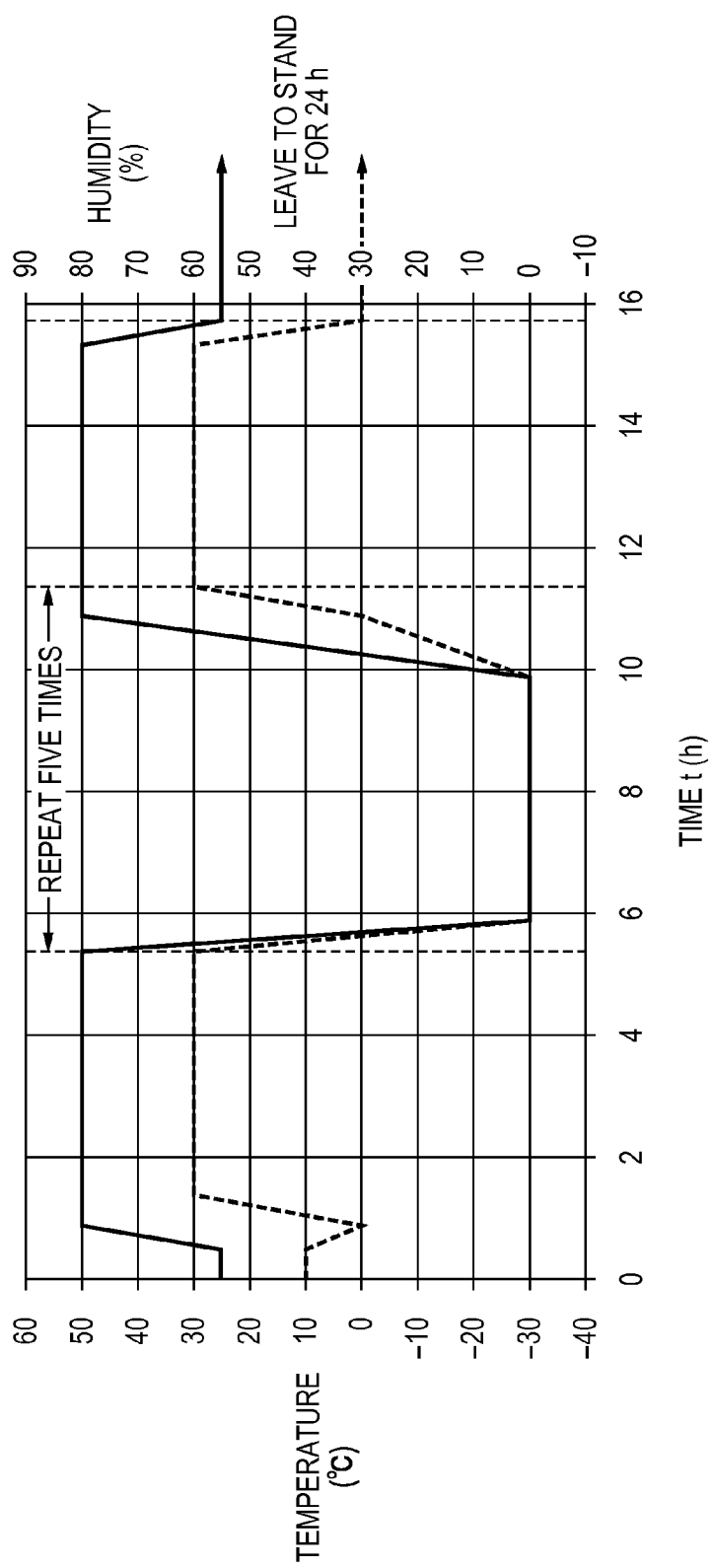
FIG. 5 is a graph for explaining an example of a heating-cooling stress test.

As a test for comparing the thermal stress resistance, a thermo cycle test of repeating a state at a temperature of 50° C. and a humidity of 60%, and a state at a temperature of −30° C. and a humidity of 0% was conducted, as exemplified in FIG. 5. The radiation detection apparatus D was free from any problem in outer appearance and practical use in the first thermo cycle test. However, in the second thermo cycle test, the scintillator layer and sensor panel peeled off. In the third thermo cycle test, the protection film and scintillator layer peeled off, and the scintillator layer was destroyed.

Examples complying with the respective embodiments will be explained with reference to FIGS. 7A to 7C.

Example 1

In Examples (1-1) to (1-6), the above-described embodiments were practiced by assigning parameters in the range of 0.7 GPa to 3.5 GPa for the modulus of elasticity in tensile of an adhesive resin 72. A scintillator paste was obtained by the same procedures as those in the reference example. At this time, a resin was added so that the volume ratio of the adhesive resin 72 to scintillator particles 71 became 2.5%. Butyl carbitol acetate was added, as needed, and the paste was adjusted to have a rotational viscosity of 150 to 300 Pa·s at a temperature of 25° C. and a rotational speed of 0.3 rpm. When a grind gauge was used after dispersing the prepared paste using a triple roll mill, the degree of dispersion was 25 μm. As the adhesive resin 72, ethylcellulose (EC), polyvinyl butyral (PVB), and polymethyl methacrylate (PMMA) having different degrees of polymerization were used. Small pieces of strip films whose thickness and weight had been measured in advance were formed, and the moduli of elasticity in tensile of these pastes were measured using a dynamic viscoelasticity measurement apparatus (DMS210) available from Seiko Instruments. The modulus of elasticity in tensile was 0.7 GPa in Example (1-1), 0.8 GPa in Example (1-2), 1.0 GPa in Example (1-3), 1.4 GPa in Example (1-4), 3.4 GPa in Example (1-5), and 3.5 GPa in Example (1-6). The volume ratio of the adhesive resin 72 to the scintillator particles 71 was 2.5%.

A sensor panel 150 was set in a screen printer, and screen printing was executed a total of three times using each of these scintillator pastes by the same procedures as those in the reference example. An opening was set in the screen printing plate to obtain a 352.5 mm×428.5 mm printed pattern at the center of the board. After the sensor panel 150 on which a scintillator layer 104 was formed was set in a transfer apparatus to transfer a protection film, pressure defoaming was performed to remove air bubbles from the side wall surface. As the protection film, a film prepared by depositing Al by 40 μm on a 50 μm-thick PET base film, further transferring a 10 μm-thick acrylic pressure sensitive adhesive, adhering Lumirror E20 #188 available from TORAY, and transferring DAITAC #8603 TNW-10 was used. Lumirror E20 #188 available from TORAY corresponds to a reflection layer 103, and DAITAC #8603 TNW-10 corresponds to an adhesive layer 102. In this way, a radiation detection apparatus in which the scintillator layer 104 was directly formed on the sensor panel 150 was obtained.

As shown in Examples (1-1) to (1-6) of FIG. 7A, the evaluation results of all these examples were an MTF of 0.31 and a sensitivity of 3,750 LSB, which were higher than those in the reference example. As is apparent from the results of thermo cycle tests, the modulus of elasticity in tensile of the adhesive resin 72 is preferably higher than 0.7 GPa and lower than 3.5 GPa.

Example 2

Examples (2-1) to (2-6) were practiced by the same procedures as those in Example 1 by assigning parameters in the range of 0.9% to 5.1% for the volume ratio of an adhesive resin 72 to scintillator particles 71. The volume ratio was adjusted using ethylcellulose (EC) as the adhesive resin 72. The volume ratio was 0.9% in Example (2-1), 1.0% in Example (2-2), 2.5% in Example (2-3), 3.5% in Example (2-4), 5.0% in Example (2-5), and 5.1% in Example (2-6). The modulus of elasticity in tensile of the adhesive resin 72 was 2.0 GPa. A radiation detection apparatus was obtained in the same way as described above.

As shown in Examples (2-1) to (2-6) of FIG. 7B, the evaluation results of all these examples were an MTF of 0.31 and a sensitivity of 3,750 LSB, which were higher than those in the reference example. As is apparent from the results of thermo cycle tests, the volume ratio of the adhesive resin 72 to the scintillator particles 71 is preferably equal to or higher than 1% and equal to or lower than 5%.

Example 3

Examples (3-1) to (3-7) were practiced by the same procedures as those in the above-described examples by assigning particle size and median size parameters for scintillator particles 71 of a scintillator layer 104. Ethylcellulose (EC) was used as an adhesive resin 72, and the volume ratio of the adhesive resin 72 to the scintillator particles 71 was adjusted. The median size and particle size were 6.2 μm and 26 μm in Example (3-1), 1.9 μm and 12 μm in Example (3-2), 2 μm and 14 μm in Example (3-3), and 4 μm and 25 μm in Example (3-4). Also, the median size and particle size were 8 μm and 25 μm in Example (3-5), 12 μm and 25 μm in Example (3-6), and 13 μm and 25 μm in Example (3-7). The modulus of elasticity in tensile of the adhesive resin 72 was 2.0 GPa, and the volume ratio of the adhesive resin 72 to the scintillator particles 71 was 2.5%. A radiation detection apparatus was obtained in the same way as described above.

As shown in Examples (3-1) to (3-7) of FIG. 7B, the evaluation results of all these examples were an MTF of 0.31 and a sensitivity of 3,750 LSB, which were higher than those in the reference example. As is apparent from the results of thermo cycle tests, the particle size of the scintillator particle 71 of the scintillator layer 104 is preferably equal to or smaller than 25 μm, and its median size is preferably equal to or larger than 2 μm and equal to or smaller than 12 μm.

Example 4

Examples (4-1) and (4-2) were practiced by the same procedures as those in the above-described examples for a case in which a scintillator layer 104 further contains, of air and a fluid material, at least the fluid material. After the scintillator layer 104 was formed on a sensor panel 150, the sensor panel 150 was set again in a screen printer, and screen printing of silicone oil was performed at a clearance of 2.2 mm using a screen printing plate (wire diameter of 23 μm, 400 meshes) available from Sonocom. Screen printing was continuously performed until the liquid level of silicone oil reached the upper end of the scintillator layer 104, without drying after printing. As the silicone oil, KF-96-3000CS (refractive index of 1.4) available from Shin-Etsu Silicone was used in Example (4-1), and HIVAC F (refractive index of 1.6) was used in Example (4-2).

As shown in FIG. 7B, the evaluation results were an MTF of 0.34 and a sensitivity of 3,950 LSB in Example (4-1), and an MTF of 0.32 and a sensitivity of 3,850 LSB in Example (4-2), which were higher than those in the reference example. The results of thermo cycle test did not exhibit any problem in practical use. Hence, more preferable results were obtained because the scintillator layer 104 further contained, of air and a fluid material, at least the fluid material.

Example 5

Example (5-1) was practiced by the same procedures as those in the above-described examples for a case in which a projecting portion 90 was arranged on a sensor panel 150 to surround a region where the sensor panel 150 and a scintillator layer 104 contacted each other. In this case, a 325-mesh screen printing plate having a 0.5 mm-wide opening 122 formed along a line of 352.75 mm in the vertical direction and 428.75 mm in the horizontal direction was used, as exemplified in FIG. 6. In FIG. 6, a region 121 is a region where an emulsion is applied, and a frame 123 is the frame of the screen printing plate.

The projecting portion 90 was formed by screen printing using an epoxy resin (AE-901T-DA available from Ajinomoto Fine-Techno). The printing was performed at a squeegee angle of 75°, a squeegee rate of 10 mm/sec, and a clearance of 2.2 mm. The epoxy resin was dried (60° C., about 60 min), forming a frame-like projecting portion 90 on the sensor panel 150. The sectional shape of the projecting portion 90 was a trapezoidal shape whose lower base was about 0.5 mm, upper base was about 0.3 mm, and height was about 50 μm. The scintillator layer 104 was formed on the sensor panel 150 on which the projecting portion 90 was formed, and a radiation detection apparatus was obtained in the same way as described above.

The dimensions of the scintillator layer 104 were measured, obtaining a target value of 352.5 mm×428.5 mm. When the dimensions of the scintillator layer 104 in Example (2-3) were also measured, they were larger by 0.8 to 1.0 mm from the target value. A base (352.5 mm×428.5 mm Lumirror E20 #188 available from TORAY) used in the reference example to form a scintillator layer had a tolerance of ±0.5 mm. It can therefore be considered that the accuracy of the outer shape was improved by arranging the projecting portion 90 on the sensor panel 150 to surround the region where the sensor panel 150 and scintillator layer 104 contacted each other.

As shown in Example (5-1) of FIG. 7B, the evaluation results were an MTF of 0.31 and a sensitivity of 3,750 LSB, which were higher than those in the reference example. In addition, the results of thermo cycle tests did not exhibit any problem in practical use.

Example 6

Example (6-1) was practiced by the same procedures as those in the above-described examples for a case in which a surface of a sensor panel 150 on which the sensor panel 150 and a scintillator layer 104 contacted each other had a three-dimensional shape.

The periphery of a surface of the sensor panel 150 on the side of a pixel array 113 was masked by a tape to cover it. A liquid was prepared by diluting organosilicasol (MEK-AC-21001) available from Nissan Chemical with methyl ethyl ketone to have an Si solids concentration of 5%. Then, the liquid was applied to the sensor panel 150. The sensor panel 150 was dried (80° C., about 30 min), the masking tape was removed, the periphery was satisfactorily trimmed with an acetone-impregnated Bemcot, and annealing (150° C., 2 h, in air) was performed. In this manner, the sensor panel 150 having a maximum of 1-μm three-dimensional shape in the pixel array 113 was obtained. The three-dimensional shape is formed into an island shape and thus hardly influences the transmittance of visible light. Thereafter, a radiation detection apparatus was obtained in the same way as described above.

As shown in FIG. 7C, the evaluation results were an MTF of 0.31 and a sensitivity of 3,800 LSB, which were higher than those in the reference example. The results of thermo cycle tests did not exhibit any problem in practical use.

Example 7

Examples (7-1) to (7-3) were practiced by the same procedures as those in the above-described examples for a case in which the modulus of elasticity in tensile of an adhesive resin 72 has a nonuniform distribution in the direction of thickness in a scintillator layer 104. This was achieved by changing the modulus of elasticity in tensile of the adhesive resin 72 in every screen printing to be performed three times. In the first printing (corresponding to the first region R1), the modulus of elasticity in tensile of the adhesive resin 72 was 2.0 GPa in all Examples (7-1) to (7-3). In the second printing (corresponding to the second region R2) and the third printing (corresponding to the third region R3), the modulus of elasticity in tensile of the adhesive resin 72 was 1.5 GPa in Example (7-1), 2.0 GPa in Example (7-2), and 2.1 GPa in Example (7-3). The volume ratio of the adhesive resin 72 to scintillator particles 71 was 2.5%. After that, a radiation detection apparatus was obtained in the same way as described above.

As shown in FIG. 7C, the evaluation results of all these examples were an MTF of 0.31 and a sensitivity of 3,750 LSB, which were higher than those in the reference example. As is apparent from the results of thermo cycle tests, the adhesive resin 72 preferably has a higher modulus of elasticity in tensile in the first region R1 than those in the second region R2 and third region R3.

Example 8

Examples (8-1) to (8-3) were practiced by the same procedures as those in Example 7 for a case in which the modulus of elasticity in tensile of an adhesive resin 72 had a nonuniform distribution in the direction of thickness in a scintillator layer 104. In the first printing (corresponding to the first region R1), the modulus of elasticity in tensile of the adhesive resin 72 was 2.0 GPa in all Examples (8-1) to (8-3). In the second printing (corresponding to the second region R2), the modulus of elasticity in tensile was 1.0 GPa in Example (8-1), 1.5 GPa in Example (8-2), and 2.0 GPa in Example (8-3). In the third printing (corresponding to the third region R3), the modulus of elasticity in tensile was 1.5 GPa in Example (8-1), 2.0 GPa in Example (8-2), and 1.5 GPa in Example (8-3). The volume ratio of the adhesive resin 72 to scintillator particles 71 was 2.5%. After that, a radiation detection apparatus was obtained in the same way as described above.

As shown in FIG. 7C, the evaluation results of all these examples were an MTF of 0.31 and a sensitivity of 3,750 LSB, which were higher than those in the reference example. As is apparent from the results of thermo cycle tests, the scintillator layer 104 is preferably arranged so that the modulus of elasticity in tensile satisfies a relation of $E_{R1}>E_{R3}>E_{R2}$ between the regions R1, R2, and R3. The moduli of elasticity in tensile of the adhesive resin 72 in the regions R1 to R3 are $E_{R1}$ for the first region R1, $E_{R2}$ for the second region R2, and $E_{R3}$ for the third region R3.

Example 9

Examples (9-1) to (9-3) were practiced by the same procedures as those in the above-described examples for a case in which the volume ratio Vr/Vs of an adhesive resin 72 to scintillator particles 71 had a nonuniform distribution in the direction of thickness in a scintillator layer 104. This was achieved by changing the volume ratio Vr/Vs in every screen printing to be performed three times. In the first printing (corresponding to the first region R1), the volume ratio Vr/Vs was 2.5% in all Examples (9-1) to (9-3). In the second printing (corresponding to the second region R2) and the third printing (corresponding to the third region R3), the volume ratio Vr/Vs was 3.0% in Example (9-1), 2.5% in Example (9-2), and 2.0% in Example (9-3). The modulus of elasticity in tensile of the adhesive resin 72 was 2.0 GPa. After that, a radiation detection apparatus was obtained in the same way as described above.

As shown in FIG. 7C, the evaluation results of all these examples were an MTF of 0.31 and a sensitivity of 3,750 LSB, which were higher than those in the reference example. As is apparent from the results of thermo cycle tests, the adhesive resin 72 of a scintillator layer 104 preferably has a higher volume ratio Vr/Vs in the first region R1 than those in the second region R2 and third region R3.

Example 10

Examples (10-1) to (10-5) were practiced by the same procedures as those in Example 9 for a case in which the volume ratio Vr/Vs of an adhesive resin 72 to scintillator particles 71 had a nonuniform distribution in the direction of thickness in a scintillator layer 104. In the first printing (corresponding to the first region R1), the volume ratio Vr/Vs was 2.5% in all Examples (10-1) to (10-5). In the second printing (corresponding to the second region R2), the volume ratio Vr/Vs was 1.5% in Example (10-1), and 1.5% in Example (10-2). Also, the volume ratio Vr/Vs was 1.5% in Example (10-3), 2.0% in Example (10-4), and 2.0% in Example (10-5). In the third printing (corresponding to the third region R3), the volume ratio Vr/Vs was 2.0% in Example (10-1), and 1.5% in Example (10-2). Also, the volume ratio Vr/Vs was 1.0% in Example (10-3), 2.5% in Example (10-4), and 2.0% in Example (10-5).

As shown in FIG. 7C, the evaluation results of all these examples were an MTF of 0.31 and a sensitivity of 3,750 LSB, which were higher than those in the reference example. As is apparent from the results of thermo cycle tests, the scintillator layer 104 is preferably arranged so that the volume ratio Vr/Vs satisfies a relation of $(Vr/Vs)_{R1}>(Vr/Vs)_{R3}>(Vr/Vs)_{R2}$ between the regions R1, R2, and R3. The volume ratios Vr/Vs in the regions R1 to R3 are $(Vr/Vs)_{R1}$ for the first region R1, $(Vr/Vs)_{R2}$ for the second region R2, and $(Vr/Vs)_{R3}$ for the third region R3.

Example 11

Examples (11-1) and (11-2) were practiced by the same procedures as those in the above-described examples for a case in which a reflection layer 103a containing inorganic powder particles 74 and an adhesive resin 72 was arranged.

First, a scintillator material ($Gd_2O_2S$:Tb, NP-30100 available from Nichia, 100 parts by weight) was dispersed in an ethylcellulose (EC) vehicle (EC-300FTP, 12.2 parts by weight) available from Nisshin Chemical Industry. Then, the scintillator material was sufficiently kneaded by a planetary stirring/defoaming machine. The obtained scintillator paste had a rotational viscosity of 300 Pa·s at a temperature of 25° C. and a rotational speed of 0.3 rpm. When a grind gauge was used after dispersing the paste using a triple roll mill, the degree of dispersion was 25 μm. The preparation of the paste used polyvinyl butyral. In both Example (11-1) and Example (11-2), the modulus of elasticity in tensile of the adhesive resin 72 was 2.0 GPa, and the volume ratio of the adhesive resin 72 to the scintillator particles 71 was 2.5%.

In contrast, a rutile titanium oxide submicron powder (PT-201 available from Ishihara Sangyo, 100 parts by weight) having an average particle size of 270 nm was dispersed in an EC vehicle (30.4 parts by weight) identical to the above-described one, and satisfactorily kneaded by the planetary stirring/defoaming machine, obtaining a titanium oxide highly filled paste. The paste had a rotational viscosity of 300 Pa·s at a temperature of 25° C. and a rotational speed of 0.3 rpm. Screen printing was performed on a scintillator layer 104 by using this paste, forming a 100 μm-thick titanium oxide powder deposition layer (reflection layer 103a) on the scintillator layer 104. The screen printing conditions including leveling and drying complied with those used to form the scintillator layer 104. Thereafter, a radiation detection apparatus was obtained in the same way as described above.

As shown in FIG. 7C, the evaluation results of all these examples were an MTF of 0.29 and a sensitivity of 3,950 LSB, which were higher than those in the reference example. In particular, the sensitivity was higher than those obtained in the above-described examples. As is apparent from the results of thermo cycle tests, the adherence property of the scintillator layer 104 is improved by arranging the reflection layer 103a containing the inorganic powder particles 74 and adhesive resin 72.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application Nos. 2012-127535, filed Jun. 4, 2012 and 2013-054140, filed Mar. 15, 2013, which are hereby incorporated by reference herein in their entirety.

What is claimed is:

1. A radiation detection apparatus comprising a sensor panel in which a plurality of sensors for detecting light are arranged, and a scintillator layer containing scintillator particles for converting an incident radiation into light, and an adhesive resin which has an adherence property and bonds the scintillator particles, wherein said scintillator layer is adhered to said sensor panel by the adhesive resin, a modulus of elasticity in tensile of the adhesive resin is higher than 0.7 GPa and lower than 3.5 GPa, and a volume ratio of the adhesive resin to the scintillator particles is not lower than 1% and not higher than 5%.

2. The apparatus according to claim 1, wherein the scintillator particle has a particle size of not larger than 25 μm and a median size of not smaller than 2 μm and not larger than 12 μm.

3. The apparatus according to claim 1, further comprising a base arranged to be adhered to said scintillator layer on a surface of the said scintillator layer opposite to a surface on which said sensor panel and said scintillator layer are adhered,
wherein said scintillator layer includes a first region, a second region, and a third region from a side of said sensor panel toward a side of said base, and
letting $E_{R1}$, $E_{R2}$, and $E_{R3}$ be moduli of elasticity in tensile of the adhesive resin in the first region, the second region, and the third region, respectively, a relation of $E_{R1} > E_{R3} > E_{R2}$ is satisfied.

4. The apparatus according to claim 1, further comprising a base arranged to be adhered to said scintillator layer on a surface of the said scintillator layer opposite to a surface on which said sensor panel and said scintillator layer are adhered,
wherein said scintillator layer includes a first region, a second region, and a third region from a side of said sensor panel toward a side of said base, and
letting $(Vr/Vs)_{R1}$, $(Vr/Vs)_{R2}$, and $(Vr/Vs)_{R3}$ be volume ratios of the adhesive resin to the scintillator particles in the first region, the second region, and the third region, respectively, a relation of $(Vr/Vs)_{R1} > (Vr/Vs)_{R3} > (Vr/Vs)_{R2}$ is satisfied.

5. The apparatus according to claim 1, wherein said sensor panel includes a portion projecting to surround a region where said sensor panel and said scintillator layer contact each other.

6. The apparatus according to claim 5, wherein a height of the projecting portion is not smaller than half of a thickness of said scintillator layer and not larger than the thickness of said scintillator layer.

7. The apparatus according to claim 1, wherein said scintillator layer further contains, of air and a fluid material, at least the fluid material, and the fluid material has a refractive index of not lower than 1 and not higher than a refractive index of the scintillator particle.

8. The apparatus according to claim 1, further comprising a protection layer which is arranged on a surface of the said scintillator layer opposite to a surface on which said sensor panel and said scintillator layer are adhered, and protects said scintillator layer, said protection layer containing inorganic powder particles and the adhesive resin.

9. The apparatus according to claim 8, wherein the inorganic powder particle has a particle size of not smaller than 190 nm and not larger than 380 nm.

10. The apparatus according to claim 1, further comprising a reflection layer which is arranged on a surface of the said scintillator layer opposite to a surface on which said sensor panel and said scintillator layer are adhered, and reflects light generated in said scintillator layer, said reflection layer being arranged to form a gap between said reflection layer and said scintillator layer.

11. The apparatus according to claim 10, wherein the gap is formed by forming a convex shape on one of said scintillator layer and said reflection layer on a surface on which said scintillator layer and said reflection layer face each other.

12. The apparatus according to claim 11, wherein the convex shape is formed in correspondence with the plurality of sensors of said sensor panel.

13. The apparatus according to claim 11, wherein the convex shape is formed in part of a peripheral region on one of said scintillator layer and said reflection layer.

14. The apparatus according to claim 11, wherein the convex shape is formed in part of a center region and part of a peripheral region on one of said scintillator layer and said reflection layer.

15. The apparatus according to claim 1, wherein the adhesive resin includes at least one of a cellulosic resin, an acrylic resin, and a polyvinyl acetal resin.

16. The apparatus according to claim 1, wherein said scintillator layer further contains colloidal silica which adheres the scintillator particles to each other.

17. An imaging system comprising:
a radiation detection apparatus defined in claim 1;
a signal processor which processes a signal from said radiation detection apparatus;
a display unit which displays the signal from said signal processor; and
a radiation source configured to generate a radiation.

18. A radiation detection apparatus comprising a sensor panel in which a plurality of sensors for detecting light are arranged, and a scintillator layer containing scintillator particles for converting incident radiation into light, and an adhesive resin which has an adherence property and bonds the scintillator particles,
wherein said scintillator layer is adhered to said sensor panel by said adhesive resin, and said adhesive resin has a modulus of elasticity in tensile higher than 0.7 GPa and lower than 3.5 GPa.

19. The apparatus according to claim 18, wherein said scintillator layer further contains colloidal silica which adheres the scintillator particles to each other.

20. An imaging system comprising:
a radiation detection apparatus defined in claim 18;
a signal processor which processes a signal from said radiation detection apparatus;
a display unit which displays the signal from said signal processor; and
a radiation source configured to generate radiation.

* * * * *